E. BLASBERG.
HEAT ACCUMULATOR FOR SELF COOKING APPARATUS.
APPLICATION FILED APR. 6, 1908.
920,719.
Patented May 4, 1909.
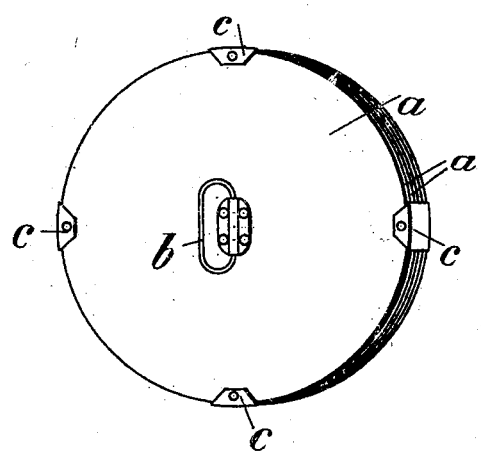
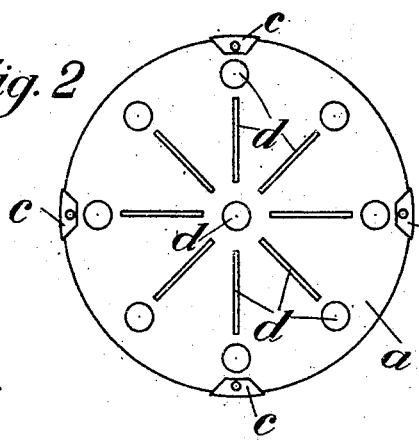 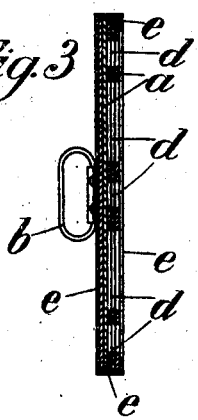
Witnesses:
Inventor:

UNITED STATES PATENT OFFICE.

EUGEN BLASBERG, OF DUSSELDORF-DERENDORF, GERMANY.

HEAT-ACCUMULATOR FOR SELF-COOKING APPARATUS.

No. 920,719.  Specification of Letters Patent.  Patented May 4, 1909.

Application filed April 6, 1906. Serial No. 310,331.

*To all whom it may concern:*

Be it known that I, EUGEN BLASBERG, manufacturer, a subject of the German Emperor, and resident of 29, Ratherstrasse, in Dusseldorf-Derendorf, in the Rhine Province, in the Kingdom of Prussia, German Empire, have invented certain new and useful Improvements in Heat-Accumulators for Self-Cooking Apparatus, of which the following is a specification.

This invention relates to so-called self cooking apparatus more particularly used for finishing underdone or parboiled food, and it consists in substance in a heat accumulator to be used in connection therewith.

This heat accumulator is formed substantially of an asbestos disk fitting into the outer vessel of the apparatus.

In the accompanying drawings two forms of construction of the invention are illustrated, like letters of reference indicating like parts in the several views.

Figure 1 is a perspective view, Fig. 2 is a back view thereof, and Fig. 3 is a section through a modification.

The asbestos disk in the case represented is comprised of a number of individual disks *a*, the upmost of which is formed with a hand grip *b* journaled thereto. The disks *a* may be connected with each other by any suitable means, such as clamps *c*, for example. A convenient number of the lower disks *a* are fitted with slots or like perforations, these forming channels *d* in the asbestos disk, as will appear from Figs. 2 and 3.

The asbestos disk is heated by a convenient source of heat, prior to being placed in position. The object of the heating channels *d* hereby is, to insure a ready and uniform reception of heat.

Instead of the clamps *c* a metal facing *e* may be provided in the manner appearing from Fig. 3, this facing lining the upmost of the disks *a* and the circumference of the asbestos disk. In this way the individual disks *a* are likewise firmly held together, but besides there are two essential advantages possessed by this form of construction. First, the asbestos disk is protected from injury, such as may be caused by the pot, placed thereon, which contains the food to be cooked, and secondly, those quantities of heat which despite the channels *d* may still be stored up unequally in the asbestos disk will be conveyed to the said pot in uniform distribution, in consequence of the well-known fact that metal is a good conductor of heat. It will be seen that the metal facing *e* in this respect performs a like office as the heating channels *d*.

It is to be understood that changes in the form, proportion, size, and minor details may be made within the scope indicated by the appended claims, without departing from the spirit or sacrificing any of the advantages of the invention.

What I claim is:

1. A heat accumulator comprising a plurality of asbestos disks, the disks below the top one having a plurality of registering openings for the passage of heat to the bottom of the topmost disk and the body portions of the adjacent disks, and means for binding the disks together.

2. A heat accumulator comprising a plurality of asbestos disks, the lowermost asbestos disks having a series of registering openings for the passage of heat, clips at the edges of the disks for holding the latter together, the edges of the asbestos disks between the clips being exposed, substantially as described.

3. A heat accumulator comprising a plurality of asbestos disks, the lowermost asbestos disks having two sets of registering openings, one set of said openings being arranged near the outer edges of the disks and in the center thereof, the other set of openings being in the form of radially disposed narrow slits located between the openings near the edges and the opening in the center of the disks, and means for holding the disks together.

In witness whereof I have hereunto signed my name this 16th day of January, 1906, in the presence of two subscribing witnesses.

EUGEN BLASBERG.

Witnesses:
WILLIAM ESSENWEIN,
ALBIN H. FREIBERG.